(12) United States Patent
Cakmak et al.

(10) Patent No.: US 10,633,286 B2
(45) Date of Patent: Apr. 28, 2020

(54) TWO-COMPONENT MORTAR COMPOUND AND USE THEREOF

(71) Applicant: HILTI AKTIENGESELLSCHAFT, Schaan (LI)

(72) Inventors: Mesut Cakmak, Munich (DE); Memet-Emin Kumru, Augsburg (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/326,386

(22) PCT Filed: Jul. 20, 2017

(86) PCT No.: PCT/EP2017/068356
§ 371 (c)(1),
(2) Date: Feb. 19, 2019

(87) PCT Pub. No.: WO2018/041465
PCT Pub. Date: Mar. 8, 2018

(65) Prior Publication Data
US 2019/0185377 A1 Jun. 20, 2019

(30) Foreign Application Priority Data

Aug. 30, 2016 (EP) ..................................... 16186195

(51) Int. Cl.

| | |
|---|---|
| *C04B 26/14* | (2006.01) |
| *C04B 40/06* | (2006.01) |
| *C08L 63/00* | (2006.01) |
| *C08G 59/50* | (2006.01) |
| *C04B 14/06* | (2006.01) |
| *C04B 18/14* | (2006.01) |
| *C04B 24/12* | (2006.01) |
| *C04B 24/42* | (2006.01) |
| *C04B 28/06* | (2006.01) |
| *C04B 111/00* | (2006.01) |
| *C08G 77/14* | (2006.01) |
| *C08G 77/26* | (2006.01) |
| *C04B 103/14* | (2006.01) |

(52) U.S. Cl.
CPC .............. *C04B 26/14* (2013.01); *C04B 14/06* (2013.01); *C04B 18/146* (2013.01); *C04B 24/121* (2013.01); *C04B 24/42* (2013.01); *C04B 28/06* (2013.01); *C04B 40/065* (2013.01); *C04B 40/0666* (2013.01); *C08G 59/50* (2013.01); *C08L 63/00* (2013.01); *C04B 2103/14* (2013.01); *C04B 2111/00715* (2013.01); *C08G 77/14* (2013.01); *C08G 77/26* (2013.01)

(58) Field of Classification Search
CPC ....................................................... C04B 26/14
See application file for complete search history.

(56) References Cited

U.S. PATENT DOCUMENTS

| | | | |
|---|---|---|---|
| 8,691,044 B2 | 4/2014 | Grun et al. | |
| 2013/0000839 A1* | 1/2013 | Grun ....................... | C04B 26/14 |
| | | | 156/293 |
| 2017/0253529 A1* | 9/2017 | Grun ...................... | C08K 5/548 |

FOREIGN PATENT DOCUMENTS

| | | |
|---|---|---|
| DE | 10 2015 109 125 | 1/2016 |
| WO | 2011/113533 | 9/2011 |
| WO | 2016/041625 | 3/2016 |

OTHER PUBLICATIONS

International Search Report dated Aug. 21, 2017 in PCT/EP2017/068356 with English-language translation.
Written Opinion dated Aug. 21, 2017 in PCT/EP2017/068356.

* cited by examiner

*Primary Examiner* — Daniel H Lee
(74) *Attorney, Agent, or Firm* — Grüneberg and Myers PLLC

(57) ABSTRACT

A two-component mortar compound contains at least one resin component (A), which, as the curable ingredient, contains at least one epoxy-base resin that can be polymerized by addition reaction; and a hardener component (B), which contains a hardening agent for the resin of the resin component (A), wherein at least one of the components contains at least one siloxane, which has at least one functional moiety that is capable of addition reaction with an epoxide but does not have any hydrolyzable group bound to a silicon atom, especially no alkoxy moieties.

11 Claims, No Drawings

TWO-COMPONENT MORTAR COMPOUND AND USE THEREOF

This application is a National Stage entry under § 371 of international Application No. PCT/EP2017/068356, filed on Jul. 20, 2017, and which claims the benefit of European Application No. 16186195.0, filed on Aug. 30, 2016.

The invention relates to a two-component mortar compound having at least one resin component (A), which as the curable ingredient contains at least one epoxy-base resin that can be polymerized by addition reaction and a hardener component (B), which contains a hardening agent for the resin of the resin component (A) as well as an organosilicon compound in at least one of the components. The subject matter of the invention is further the use of the mortar compound for chemical fastening of structural parts such as threaded anchor rods, rebars, threaded sleeves and screws in drilled holes, which are made in a mineral substrate.

For more secure fastening of structural parts, such as threaded anchor rods, rebars, threaded sleeves and screws in a mineral substrate such as concrete, natural rock or plaster, the drilled holes for receiving the structural parts to be fastened are first drilled with appropriate dimensions in the mineral substrate. Then the drilling dust is cleared from the drilled holes and the two-component mortar compound, after the resin component has been mixed with the hardener component, is introduced into the drilled hole. Thereupon the structural part to be fastened is introduced into and adjusted in the drilled hole filled with mortar compound. After the mortar compound has cured due to reaction of the resin component with the hardener component, a firm grip of the structural part in the mineral substrate is established.

The load-bearing capacity of the structural parts fastened in this way depends on several influencing variables, which are usually classified as internal and external variables. The internal influencing variables include the chemical composition of the mortar compound, the process by which it is manufactured and the packaging of the mortar compound, which typically comprises components present in two separate containers.

The external influencing variables include, among others, the way in which the drilled holes are cleaned, the quality of the mineral substrate, for example of concrete, its wetness and its temperature as well as the way in which the drilled holes are produced.

It is further known that the mechanical properties of the cured mortar compound are influenced substantially by the quality of cleaning of the drilled holes and the wetness of the mineral substrate. In drilled holes that are wet and/or have been cleaned only poorly of drilling dust, a considerable performance deterioration takes place, manifested by reduced load ratings of the cured mortar compound.

WO 2011/113533 A1 relates to a fastening mortar system used for mortar fixation of anchoring means and based on one or more epoxy-base curable reactive resins in holes or gaps, the said system containing one or more silanes, which optionally have reactive groups capable of participating in the polymerization with the epoxy-base reactive resin and in any case silicon-bound hydrolyzable groups. Halogen, ketoximate, amino, aminoxy, mercapto, acyloxy, aryloxy, aralkyloxy and especially alkyloxy groups are used as silicon-bound hydrolyzable groups in the one or more silanes.

These mortar compounds known in the prior art already exhibit an improvement of load ratings in wet drilled holes. However, monomeric silanes containing hydrolyzable and especially silicon-bound groups have the disadvantage that they release enormous quantities of volatile organic compounds (VOC), for example alcohols, due to hydrolysis during use.

In order to reduce the proportion of VOCs formed during curing, DE 10 2015 109 125 A1 discloses a hardener composition for a synthetic mortar system that can be cured by addition polymerization for mortar fixation of anchoring means in holes or gaps, wherein the hardener composition contains oligomeric siloxanes, which on average have at least one organic moiety per molecule. The organic moiety carries one or more secondary and/or primary amino and/or thiol groups capable of reacting with isocyanate or epoxy groups during the additional reaction. Furthermore, the siloxanes still have one or more hydrolyzable groups bound to silicon. Besides this, the hardener composition may contain one or more further common additives. The described siloxane oligomers are derived from structural elements of the alkoxysilanes and therefore they still always have hydrolyzable groups that release VOCs, especially in the form of alcohols, during hydrolysis. The proportion of VOCs may be reduced by up to 50% by oligomerization according to DE 10 2015 109 125 A1.

Compared with the known prior art, a further need therefore exists for two-component mortar compounds having good adhesion in dry and wet drilled holes, which compounds can be processed simply and in which the formation of VOCs during processing can be further reduced or prevented entirely.

This object is solved by a two-component mortar compound according to the following claim 1.

Preferred embodiments of the inventive mortar compound are specified in the dependent claims, which optionally may be combined with one another.

Subject matter of the invention is further the use of the compound for chemical fastening of structural parts such as threaded anchor rods, rebars, threaded sleeves and screws in drilled holes, which are present in a mineral substrate, preferably concrete.

In its general form, the invention comprises a two-component mortar compound having at least one resin component (A), which as the curable ingredient contains at least one epoxy-base resin that can be polymerized by addition reaction and a hardener component (B), which contains a hardening agent for the resin of the resin component (A). The mortar compound is characterized in that at least one of the components contains at least one siloxane, which has at least one functional moiety that is capable of an addition reaction with epoxides but does not have any hydrolyzable groups bound to a silicon atom, especially no alkoxy moieties.

The inventive two-component mortar compound contains preferably no siloxanes having silicon-bound hydrolyzable groups. Moieties such as halogen atoms, ketoximate, amino, aminoxy, mercapto, acyloxy, aryloxy, aralkyloxy (=arylalkoxy) or especially alkyloxy (alkoxy) moieties, for example, which are bound via a hetero atom to a silicon atom, are to be understood as silicon-bound hydrolyzable groups.

Within the meaning of the present invention, chemical compounds composed of siloxane units are understood as siloxanes. In these siloxane units, the silicon atoms which do not have their octet (electron shell) filled by formation of bonds with oxygen are saturated with organic moieties. In contrast to the (poly)silanes, the silicon atoms are bonded not to one another but instead via exactly one oxygen atom to their neighboring silicon atom: Si—O—Si.

A siloxane unit may have one to four further substituents, depending on the number of free valences on the oxygen:

$R_nSiO_{(4-n)/2}$ (n=0, 1, 2, 3), i.e. one siloxane unit may have one to four further substituents, depending on the number of valences remaining free on the oxygen. The siloxane units may therefore be mono-, di-, tri- and tetrafunctional, wherein the following abbreviations are usually used: $[M]=R_3SiO_{1/2}$, $[D]=R_2SiO_{2/2}$, $[T]=RSiO_{3/2}$ and $[Q]=SiO_{4/2}$.

Linear (poly)siloxanes have the structure $[MD_nM]$, corresponding to the general formula $R_3Si$—$[O$—$SiR_2]_n$—$O$—$SiR_3$, wherein R may be hydrogen atoms or organic groups, for example alkyl groups, and n denotes 0 or a whole number. One example of a linear polysiloxane is poly(dimethylsiloxane).

Branched polysiloxanes, which as branching elements have trifunctional or tetrafunctional siloxane units, have the structure $[M_nD_mT_n]$, wherein n and m denote whole numbers. The branching positions in these cases are present either in a chain or a ring. Cyclic polysiloxanes are composed of rings formed by difunctional siloxane units and have the structure $[D_n]$, wherein n denotes a whole number greater than or equal to 3. Cross-linked polysiloxanes in this group have molecular chains or rings, which by means of tri- and tetrafunctional siloxane units are linked as planar or three-dimensional networks.

The siloxane skeleton may contain various hydrocarbon moieties, and functional groups as well as organofunctional groups bound to silicon may be present. However, no functional groups bound to silicon are present in the siloxanes used according to the invention. Functional groups or moieties within the meaning of the present invention are therefore always organofunctional moieties, in other words functional moieties bound to carbon.

The inventive siloxanes make the use of silanes or siloxanes containing silicon-bound hydrolyzable moieties superfluous or are able to replace the known hydrolyzable silanes and siloxanes completely or partly. It is suspected that the siloxanes used according to the invention make the mortar surface adequately hydrophobic, in order to reduce water uptake by the mortar or diffusion of hardeners such as amines into the water layer at the interface between mortar and drilled hole. This leads surprisingly to good curing of the chemical mortar even at the interface, despite the absence of silicon-bound hydrolyzable moieties.

With the inventive siloxanes, which are free of hydrolyzable silicon-bound moieties, an improvement of the mortar performance under critical drilled-hole conditions is possible both in dry and water-saturated concrete for holes drilled by hammer-drilling and diamond-drilling and, in fact, even without the formation of undesired VOCs. Both in dry, cleaned drilled holes and in half-cleaned and/or wet drilled holes, the fastening of structural parts using the inventive two-component mortar compound yields high load ratings, which are increased compared with siloxane-free or sometimes even silane-containing compounds, without relying on prior art silanes or siloxane oligomers, which pollute the environment by forming VOCs.

In a preferred embodiment, the two-component mortar compound contains at least one siloxane, which has at least one functional terminal moiety capable of additional reaction with epoxy groups. Further preferably, the siloxane has two or more identical or different, particularly preferably two identical terminal functional moieties capable of addition reaction with epoxy groups. Due to the functionalization of the inventive siloxanes, they are capable of being incorporated strongly into the polymer structure and optionally also of being used as hardening agents for the resin, when the functional moiety is, for example, an amino group.

Preferred functional moieties capable of addition reaction with epoxy groups in one of the above-mentioned embodiments of the invention are selected from the group consisting of hydroxy, carboxy, amino, sec-amino, mercapto, isocyanato, alkenyl, (meth)acryloyl, anhydrido and epoxy moieties, preferably from the group consisting of epoxy and amino moieties.

In a further preferred embodiment of the inventive two-component mortar compound, the siloxane has the structure $R_3Si$—$[O$—$Si(R^1)_2]_n$—$O$—$SiR_3$, where n stands for 0 or a whole number from 1 to 1000 inclusive, preferably for 0 or 1 to 5;

R and $R^1$, independently of one another, respectively stand for a $C_1$-$C_{20}$ alkyl moiety or aralkyl moiety that optionally contains hetero atoms, optionally is substituted and optionally contains at least one moiety capable of addition reaction with epoxy groups. Preferably, $R^1$ stands for an unsubstituted $C_1$-$C_4$ alkyl moiety, especially a methyl moiety.

The hetero atoms are preferably oxygen atoms. The R and $R^1$ moieties are respectively bound via a carbon atom to silicon.

In this embodiment, the siloxane has preferably one and further preferably two or more substituted $C_1$-$C_{20}$ alkyl or aralkyl moieties, wherein the substituents are selected from the group consisting of trialkylsilyl (e.g. trimethylsilyl), hydroxy, carboxy, amino, sec-amino, mercapto, isocyanato, alkenyl, (meth)acryloyl, anhydrido and epoxy moieties, preferably from the group consisting of epoxy, (meth)acryloyl, trimethylsilyl and amino moieties and particularly preferably from the group consisting of epoxy and amino moieties.

In particular, the siloxanes are selected from the group consisting of 1,3-bis(2-aminoethylaminoethyl)tetramethyldisiloxane, 1,3-bis(glycidoxypropyl)tetramethyl-disiloxane, tris(glycidoxypropyldimethylsiloxy)phenylsilane, 3-methacryloxypropylpentamethyldisiloxane, poly(acryloxypropylmethyl)siloxane, 1,3-bis(acryloxypropylmethyl)siloxane, 1,3-bis(3-methacryloxypropyl)tetrakis-(trimethylsiloxy) disiloxane, 1,3-bis(3-methacryloxypropyl)tetramethyldisiloxane, monomethacryloxypropyl-terminated polydimethylsiloxane, poly[dimethylsiloxane-co-(3-(monomethacryloxy)propyl)methylsiloxane], 1,3-bis(4-methacryloxybutyl)-tetramethyldisiloxane, (methacryloxypropyl)methylsiloxane/dimethylsiloxane copolymer, dodecamethylpentasiloxane, 1,1,1,3,5,7,7,7-octamethyl-3,5-bis(trimethylsilanyloxy)tetrasiloxane, trimethylsilyl-terminated poly(methylhydrosiloxane), bis(hydroxyalkyl)-terminated poly(dimethylsiloxane), poly[di-methylsiloxane-co-(2-(3,4-epoxycyclohexyl)ethyl)methylsiloxane], diglycidylether-terminated poly(dimethylsiloxane), poly[dimethylsiloxane-co-[3-(2-(3-hydroxy-ethoxy)ethoxy)propyl] methylsiloxane] and monoglycidylether-terminated poly(dimethylsiloxane) as well as mixtures thereof.

Particularly preferred examples are 1,3-bis(2-aminoethylaminoethyl)tetramethyldisiloxane 1,3-bis(glycidoxypropyl)tetramethyl-disiloxane and tris(glycidoxypropyldimethylsiloxy)phenylsilane as well as mixtures thereof.

Within the meaning of the invention, a "two-component mortar compound" will be understood as a mortar compound that consists of a curable resin component and a hardener component for the resin component, wherein the resin component and the hardener component are stored separated from one another, so that no reaction of the hardener component with the resin component takes place during storage. Curing of the reactive resin is started by mixing the hardener component with the reactive resin immediately before use of the mortar compound.

Weight values mentioned hereinafter will be understood as percent by weight relative to 100 percent by weight of the total of the individual components (total weight of the mortar compound), unless otherwise indicated.

The siloxanes used according to the invention may exist individually or as a mixture and be present in a proportion by weight of 0.5 to 10 wt %, preferably of 0.5 to 8 wt % and further preferably of 1.5 to 5 wt % relative to the total two-component mortar system.

Surprisingly, it has been found that improved adhesion of the cured mortar to the concrete surface as well as improved load ratings of cast-in-place fastening means commonly used in the construction sector, such as dowels, anchors, threaded screws and bolts, for example, can already be achieved in wet and dry concrete even at low siloxane proportions in the mortar compounds.

The epoxy-base resin component contained in the inventive two-component mortar systems includes at least one epoxy component, preferably on the basis of glycidyl compounds, for example such with an average glycidyl-group functionality of 1.5 or greater, especially of 2 or greater, e.g. from 2 to 10. The epoxy component may optionally include further glycidyl ethers as reactive diluents. The epoxy resins of the epoxy component are preferably polyglycidyl ethers of an at least dihydric alcohol or phenol, such as novolak, bisphenol F or bisphenol A, or mixtures of such epoxides, which may be obtained, for example, by reaction of the corresponding multihydric alcohols with epichlorohydrin. Suitable examples are hexanediol diglycidyl ether, trimethylolpropane triglycidyl ether, novolak epoxy resins, bisphenol-A-epichlorohydrin resins and/or bisphenol-F-epichlorohydrin resins, for example with an average molar mass of $M_n \leq 2000$ g/mol. For example, the epoxy resins may have an epoxy equivalent of 120 to 2000, preferably 150 to 400, such as especially 155 to 195, for example 165 to 185.

Certain of the above-mentioned epoxy compounds, such as trimethylolpropane triglycidyl ether or hexanediol diglycidyl ether, which have a lower viscosity than epoxides containing aromatic groups, may also be used as reactive diluents.

The proportion of epoxy components in the total mass of the two-component system is preferably 5 to 90 wt %, especially 20 to 80 wt %, 30 to 70 wt % or 40 to 60 wt %. Mixtures of two or more epoxy components are also possible. Suitable epoxy resins, reactive thinners and hardeners can also be found in the standard opus of Michael Dornbusch, Ulrich Christ and Rob Rasing, "Epoxy Resins", Vincentz Network GmbH & Co KG (2015), ISBN 13: 9783866308770. These compounds are incorporated here by reference.

Examples of further ingredients of the resin component (A) are accelerators, thixotropic agents, fillers and further additives as well as mixtures thereof.

As examples of accelerators, tertiary amines, imidazoles or tertiary aminophenols such as tris-2,4,6-dimethylaminomethylphenol, organophosphines, Lewis bases or acids such as phosphoric acid esters, or mixtures of two or more thereof may be used. The accelerators may be included in one or both components, preferably in the hardener component (B). Preferably, the accelerators are contained in the hardener component in a proportion by weight of 0.001 to 15 wt %.

In a preferred embodiment, the two-component mortar compound contains at least one thixotropic agent in the resin component (A) and/or in the hardener component (B). Common rheology additives, such as precipitated or fumed silica, bentonites, celluloses and/or kaolin may be used as thixotropic agents. The thixotropic agents may be added, for example, in a proportion by weight of 0.5 to 30 wt %, preferably of 2 to 20 wt %, relative to the total weight of the mortar compound.

Finally, the inventive two-component mortar compound may contain at least one inorganic filler in the resin component (A) and/or in the hardener component (B). In particular, cements such as Portland cement or alumina cement as well as other hydraulically binding inorganic substances, quartz, glass, corundum, porcelain, stoneware, heavy spar, light spar, gypsum, talc and/or chalk as well as mixtures thereof are used as fillers. The inorganic fillers may be added in the form of sand, flour or shaped bodies, preferably in the form of fibers or beads. The fillers may be present in one or in both components of the two-component system. The proportion of fillers is preferably 0 to 90 wt %, for example 10 to 90 wt %, preferably 15 to 75 wt % and further preferably 20 to 50 wt %, relative to the total weight of the mortar compound.

Furthermore, further additives may also be added, such as plasticizers, nonreactive diluents, flexibilizers, stabilizers, rheology additives, wetting agents, coloring additives, such as dyes or pigments, for example for different coloration of the components to permit better control of intermixing, as well as mixtures of the said additives. Such further additives may be added preferably in proportions by weight of 0 to 40 wt % in total, relative to the total weight of the mortar compound.

The hardening agent of the hardener component (B) comprises at least one compound commonly used for curing epoxides. The compounds commonly used for curing epoxides and serving as reaction partners in the polyaddition are in particular compounds having two or more functional groups, which are selected from the group consisting of amino, imino and mercapto as well as combinations thereof. Suitable examples are amines, thiols, aminothiols and mixtures thereof, such as mentioned, for example, in Michael Dornbusch, Ulrich Christ and Rob Rasing, "Epoxy Resins", Vincentz Network GmbH & Co KG (2015), ISBN 13: 9783866308770, which are incorporated here by reference thereto. Particularly preferred hardening agents are the di- or polyamines and/or di- or polythiols mentioned therein.

Mixtures of two or more of the cited compounds commonly used for curing epoxides may also be used or included.

The compounds commonly used for curing epoxides are preferably present in proportions of up to 50 wt %, preferably of 5 to 30 wt %, especially 10 to 20 wt %, relative to the total mass of the two-component mortar system.

Relative to the weight of the hardener component (B), the proportion of the hardening agent may be 1 to 100 wt %, for example 3 to 95 wt %, preferably 4 to 95 wt % and further preferably 5 to 90 wt %, and particularly preferably 10 to 80 wt %.

Further ingredients of the hardener component (B) of the inventive two-component system may comprise organic solvents such as benzyl alcohol, fillers such as the fillers mentioned above for the resin component (A) and further of the above-mentioned additives.

The inventive two-component mortar compound is preferably kept in casings, cartridges or foil bags, which are labeled to show that they comprise two or more chambers separated from one another, in which the resin component (A) and the hardener component (B) of the mortar compound are disposed separated from one another in order to inhibit reaction.

The inventive two-component mortar compounds may advantageously have the following total composition of resin component (A) and hardener component (B):
curable epoxy resin in a proportion of 30-60 wt %,
at least one siloxane in a proportion of 0.5-10 wt %,
thixotropic agents in a proportion of 0-5.0 wt %,
inorganic fillers in a proportion of 20-80 wt %,
hardening agents for epoxides in a proportion of 10 to 20 wt %, and
further additives in a proportion of 0 to 40 wt %,
wherein the total of per cents by weight equals 100.

According to the invention, the at least one siloxane has at least one functional moiety that is capable of addition reaction with epoxides but does not have any hydrolyzable groups bound to a silicon atom, especially no alkoxy groups.

For application as intended, the resin component (A) and the hardener component (B) are emptied out of the separate chambers and mixed in a suitable apparatus, for example a static mixer or a dissolver. The mixture of resin component (A) and hardener component (B) is then introduced by means of a known injection apparatus into the previously cleaned drilled hole. Then the structural part to be fixed is inserted into the mortar compound and adjusted. The hardening agent of the hardener component (B) reacts with the epoxides of the resin component (A) with polyaddition, so that the mortar compound cures within a few hours under environmental conditions.

The inventive two-component mortar compound exhibits improved adhesion, especially to wet concrete. Furthermore, high load ratings are achieved even in wet drilled holes and/or in case of poor cleaning of the drilled holes made in the mineral substrate. It has been surprisingly shown that the improved adhesion as well as increased load ratings may be achieved even without the use of hydrolyzable silanes or siloxane oligomers. It may only be surmised that the inventive replacement of conventional silanes having hydrolyzable silicon-bound groups by siloxanes having only organofunctional moieties leads to adequate hydrophobing of the mortar surface, thus reducing the water uptake by the mortar or the diffusion of hardeners such as amines into the water layer at the interface between mortar and drilled hole, to such an extent that good curing of the chemical mortar takes place even at the interface. At the same time, the evolution of volatile organic compounds during curing of the mortar compound is considerably reduced, as is therefore the environmental pollution.

Subject matter of the invention is therefore also the use of the inventive two-component mortar compound for chemical fastening of structural parts, especially threaded anchor rods, rebars, threaded sleeves and screws in drilled holes, which are present in a mineral substrate, preferably concrete.

Further advantages of the invention will become evident from the following examples which, however, are in no way to be interpreted as limitative.

EXAMPLES OF PRODUCTION

Examples 1 to 5

The resin component (A) is prepared first by mixing the ingredients indicated in Table 1, wherein the ingredients are first prestirred manually and then mixed in a speed mixer for 10 seconds at 1000 rpm, then for 20 seconds at 2500 rpm and then for 15 seconds at 1500 rpm.

For production of the hardener component (B), the ingredients indicated in Table 2 are mixed together, prestirred manually and then mixed in a speed mixer for 10 seconds at 1000 rpm, then for 20 seconds at 2500 rpm and then for 15 seconds at 1500 rpm.

Then the resin component (A) and the hardener component (B) are united in the calculated ratio, prestirred manually and them mixed in the speed mixer for 10 seconds at 1500 rpm. The mixing ratio of components (A) and (B) in examples 1 to 5 was approximately 3:1 (w/w).

A composition commercially available under the designation Epilox M884 (LEUNA-Harze GmbH) was used as the epoxy resin in Examples 1 to 5. The amine hardener is available under the designation Beckopox SEH 2627 from the Allnex Co. of Belgium.

The abbreviations contained in Tables 1 and 2 for the siloxanes that were used have the following meanings:
EPSilox1: 1,3-bis(glycidoxypropyl)tetramethyldisiloxane
EPSilox2: Tris(glycidoxypropyldimethylsiloxy)phenylsilane
Amsilox: 1,3-bis(3-aminopropyl)tetramethyldisiloxane

TABLE 1

Resin component (A)

|  | Example 1 (comparison) [wt %] | Example 2 [wt %] | Example 3 [wt %] | Example 4 [wt %] | Example 5 [wt %] |
| --- | --- | --- | --- | --- | --- |
| Epoxy resin | 61.3 | 61.3 | 57.0 | 57.0 | 57.1 |
| Quartz flour | 35.7 | 35.7 | 35.9 | 35.9 | 35.9 |
| Fumed silica | 3.0 | 3.0 | 3.0 | 3.0 | 3.0 |
| EPSilox1 |  |  | 4.1 | 4.1 |  |
| EPSilox2 |  |  |  |  | 4.0 |
| Total | 100 | 100 | 100 | 100 | 100 |

TABLE 2

Hardener component (B)

|  | Example 1 (comparison) [wt %] | Example 2 [wt %] | Example 3 [wt %] | Example 4 [wt %] | Example 5 [wt %] |
| --- | --- | --- | --- | --- | --- |
| Amine hardener | 62.4 | 53.0 | 58.5 | 62.4 | 62.4 |
| Amsilox |  | 10.3 | 4.2 |  |  |
| Fumed silica | 4.0 | 4.0 | 4.0 | 4.0 | 4.0 |
| Quartz flour | 13.6 | 13.2 | 13.5 | 13.6 | 13.6 |
| Alumina cement | 20.0 | 19.5 | 19.8 | 20.0 | 20.0 |
| Total | 100 | 100 | 100 | 100 | 100 |

Examples 6 to 10

The resin component (A) is prepared first by mixing the ingredients indicated in Table 3, wherein the ingredients are first prestirred manually and then mixed in a speed mixer for 10 seconds at 1000 rpm, then for 20 seconds at 2500 rpm and then for 15 seconds at 1500 rpm.

For production of the hardener component (B), the ingredients indicated in Table 4 are mixed together, prestirred manually and then mixed in a speed mixer for 10 seconds at 1000 rpm, then for 20 seconds at 2500 rpm and then for 15 seconds at 1500 rpm.

Then the resin component (A) and the hardener component (B) are united in the calculated ratio, prestirred manually and them mixed in the speed mixer for 10 seconds at 1500 rpm. The mixing ratio of components (A) and (B) in examples 6 to 10 was approximately 3:1 (w/w).

A composition commercially available under the designation Araldite BY 20157 (Huntsman Advanced Materials) was used as the epoxy resin in Examples 6 to 10. The amine hardener is available under the designation Aradur 30446 of Huntsman Advanced Materials.

The abbreviations contained in Tables 3 and 4 for the silicon compounds that were used have the following meanings:

Dynasilan: (3-Glycidyloxypropyl)trimethoxysilane
EPSilox1: 1,3-bis(glycidoxypropyl)tetramethyldisiloxane
EPSilox2: Tris(glycidoxypropyldimethylsiloxy)phenylsilane
Amsilox: 1,3-bis(3-aminopropyl)tetramethyldisiloxane

TABLE 3

Resin component (A)

| | Example 6 (comparison) [wt %] | Example 7 [wt %] | Example 8 [wt %] | Example 9 [wt %] | Example 10 [wt %] |
|---|---|---|---|---|---|
| Epoxy resin | 61.4 | 61.4 | 57.4 | 57.4 | 57.4 |
| Quartz flour | 35.8 | 35.8 | 35.8 | 35.8 | 35.8 |
| Fumed silica | 2.8 | 2.8 | 2.8 | 2.8 | 2.8 |
| EPSilox1 | | | 4.0 | 4.0 | |
| EPSilox2 | | | | | 4.0 |
| Total | 100 | 100 | 100 | 100 | 100 |

TABLE 4

Hardener component (B)

| | Example 6 (comparison) [wt %] | Example 7 [wt %] | Example 8 [wt %] | Example 9 [wt %] | Example 10 [wt %] |
|---|---|---|---|---|---|
| Amine hardener | 60.7 | 50.7 | 56.7 | 60.7 | 60.7 |
| Amsilox | | 10.0 | 4.0 | | |
| Fumed silica | 4.3 | 4.3 | 4.3 | 4.3 | 4.3 |
| Quartz flour | 19.5 | 19.5 | 19.5 | 19.5 | 19.5 |
| Alumina cement | 13.0 | 13.0 | 13.0 | 13.0 | 13.0 |
| Accelerator | 2.5 | 2.5 | 2.5 | 2.5 | 2.5 |
| Total | 100 | 100 | 100 | 100 | 100 |

Example 11

Check of the Internal Strength by Pull-Off Test

Diamond-sawed concrete C20/25, respectively in wet and dry condition, was used as the substrate. Round metal plates having a ring of double-sided adhesive tape as spacer are fastened to the substrate to be bonded and are filled with the mortar compound. After curing at room temperature (20° C., 1 day), the adhesive strength is measured with an adhesion-testing machine (DYNA Z, manufactured by proceq).

The results are presented in Table 5 below:

TABLE 5

Adhesive strength in the pull-off test

| | Dry concrete | | Wet concrete | |
|---|---|---|---|---|
| Examples | Pull-off diameter [N/mm2] | Change [%] | Pull-off diameter [N/mm2] | Change [%] |
| 1 (comparison) | 3.7 | 0 | 0.7 | 0 |
| 2 | 5.3 | 43.2 | 2.3 | 228 |
| 3 | 5.1 | 37.8 | 2.5 | 257 |
| 4 | 5.1 | 37.8 | 2.7 | 285 |
| 5 | 4.6 | 12.4 | 2.3 | 2282 |
| 6 (comparison) | 3.9 | 0 | 0.9 | 0 |
| 7 | 4.7 | 20.5 | 1.9 | 11.1 |
| 8 | 4.0 | 2.5 | 2.2 | 44.4 |
| 9 | 5.0 | 28.2 | 2.1 | 33.3 |
| 10 | 4.9 | 25.6 | 2.5 | 77.7 |

As is apparent from the test results, the adhesive strength of the inventive mortar compounds is improved on dry and especially water-saturated concrete and at the same time the formation of undesired VOCs is prevented by the use of epoxy-functional or amino-functional siloxanes without silicon-bonded hydrolyzable groups compared with the comparison compounds without epoxy-functional or amino-functional siloxanes (Examples 1 and 6).

Example 12

Determination of the Load Ratings in Wet Concrete

For determination of the load ratings achieved with two-component mortar compounds according to Examples 6 to 10, a high-strength M12 threaded anchor bar is used in the form of a dowel held by the inventive two-component mortar compound in a drilled hole having a diameter of 14 mm and a drilled-hole depth of 72 mm. After a predesignated curing time at room temperature, the mean failure load is measured by pulling the threaded anchor bar out centrally against closely positioned bracing means, and the mean failure load of five anchors is determined.

The investigated drilled holes were prepared using a diamond drill and the drilled hole was cleaned two times with compressed air (6 bar), brushed and then blown out again twice with compressed air.

To measure the load ratings in wet concrete, the drilled holes were filled with water, after which the water was left to act for one day. Then the water was sucked out and the anchor bars were set using the mortar compound. The mortar compound was cured at room temperature (21±2° C.) for 24 hours.

The load ratings determined for Examples 6 to 10 are reported in Table 6 below.

TABLE 6

Load ratings in wet concrete

| Examples | Failure load [N/mm2] | Change [%] |
|---|---|---|
| 6 (comparison) | 27.9 | 0 |
| 7 | 32.5 | 16.5 |
| 8 | 32.7 | 17.2 |
| 9 | 33.3 | 19.3 |
| 10 | 33.3 | 19.3 |

The test results show a distinct improvement of the mortar performance under critical drilled-hole conditions for the inventive mortar compounds. Further tests reveal that the improvement of the load ratings under the indicated conditions is also achieved for mortar compounds that contain between 1.5 percent by weight and 4 percent by weight of siloxanes without silicon-bound hydrolyzable groups.

The invention claimed is:

1. A two-component mortar composition, comprising:
   at least one resin component (A), which contains at least one epoxy-base resin as a curable ingredient that can be polymerized by addition reaction; and
   a hardener component (B), which contains a hardening agent for the resin of the resin component (A),
   wherein at least one of the components contains at least one siloxane which has at least one functional moiety that is capable of addition reaction with an epoxide but does not have any hydrolyzable group bound to a silicon atom.

2. The two-component mortar composition according to claim 1, wherein the functional moiety capable of addition reaction with epoxy groups is a terminal moiety.

3. The two-component mortar composition according to claim 2, wherein the functional moiety is selected from the group consisting of hydroxy, carboxy, amino, sec-amino, mercapto, isocyanato, alkenyl, (meth)acryloyl, anhydrido and epoxy moieties.

4. The two-component mortar composition according to claim 1, wherein the siloxane has the structure $R_3Si-[O-Si(R^1)_2]_n-O-SiR_3$,
   where n stands for 0 or a whole number from 1 to 1000 inclusive,
   R and $R^1$, independently of one another, respectively stand for a $C_1$-$C_{20}$ alkyl moiety or aralkyl moiety that optionally contains a hetero atom and optionally has at least one moiety capable of addition reaction with an epoxy group.

5. The two-component mortar composition according to claim 1, wherein the siloxane has two or more identical or different terminal functional moieties capable of addition reaction with an epoxy group.

6. The two-component mortar composition according to claim 1, wherein the siloxane is selected from the group consisting of 1,3-bis(2-aminoethylaminoethyl)tetramethyldisiloxane, 1,3-bis(glycidoxypropyl)tetramethyl-disiloxane, tris(glycidoxypropyldimethylsiloxy)phenylsilane, 3-methacryloxy-propylpentamethyldisiloxane, poly(acryloxypropylmethyl)siloxane, 1,3-bis(acryloxypropylmethyl)siloxane, 1,3-bis(3-methacryloxypropyl)tetrakis-(trimethylsiloxy)disiloxane, 1,3-bis(3-methacryloxypropyl) tetramethyldisiloxane, monomethacryloxypropyl-terminated polydimethylsiloxane, poly[dimethylsiloxane-co-(3-(monomethacryloxy)propyl)methylsiloxane], 1,3-bis(4-methacryloxybutyl)-tetramethyldisiloxane, (methacryloxypropyl)methylsiloxane/dimethylsiloxane copolymer, dodecamethylpentasiloxane, 1,1,1,3,5,7,7,7-octamethyl-3,5-bis(trimethylsilanyloxy)tetrasiloxane, trimethylsilyl-terminated poly(methylhydrosiloxane), bis(hydroxyalkyl)-terminated poly(dimethylsiloxane), poly[dimethylsiloxane-co-(2-(3,4-epoxycyclohexyl)ethyl) methylsiloxane], diglycidylether-terminated poly (dimethylsiloxane), poly[dimethylsiloxane-co-[3-(2-(3-hydroxy-ethoxy)ethoxy)propyl]methylsiloxane] and monoglycidylether-terminated poly(di-methylsiloxane).

7. The two-component mortar composition according to claim 1, wherein a proportion of the siloxane is 0.5 to 20 wt %, relative to the total weight of the two-component composition.

8. The two-component mortar composition according to claim 1, wherein the resin component (A) and/or the hardener component (B) contains at least one thixotropic agent as a further ingredient.

9. The two-component mortar composition according to claim 1, wherein the resin component (A) and/or the hardener component (B) contains at least one inorganic filler as a further ingredient.

10. The two-component mortar composition according to claim 1, wherein the composition is present in a casing, a cartridge or a foil bag, wherein the resin component (A) and the hardener component (B) are disposed in chambers separated from one another.

11. A method for chemical fastening of a structural part which is present in a mineral substrate, said method comprising:
    applying the composition of claim 1 to the mineral substrate and/or the structural part;
    wherein said structural part is selected from the group consisting of a threaded anchor rod, a rebar, a threaded sleeve and a screw in a drilled hole.

* * * * *